United States Patent [19]
Ito

[11] Patent Number: 5,864,787
[45] Date of Patent: Jan. 26, 1999

[54] DIGITAL IMAGE RECORDING APPARATUS AND METHOD

[75] Inventor: Wataru Ito, Kanagawa-ken, Japan

[73] Assignee: Fuji Photo Film Co., Ltd., Kanagawa-ken, Japan

[21] Appl. No.: 823,312

[22] Filed: Mar. 21, 1997

[30] Foreign Application Priority Data

Mar. 22, 1996 [JP] Japan .................................. 8-065601

[51] Int. Cl.⁶ .............................. G06K 9/32; G06K 9/36
[52] U.S. Cl. ........................ 702/190; 382/276; 382/298; 382/299; 382/300
[58] Field of Search .................................. 364/577, 723, 364/724.1, 853; 382/276, 298, 299, 300; 386/50, 73; 704/265; 348/441, 576, 580, 581; 381/94.4; 345/428, 436, 439, 475, 127, 523; 358/525, 428; 702/190, 189

[56] References Cited

U.S. PATENT DOCUMENTS

| | | | |
|---|---|---|---|
| 4,974,065 | 11/1990 | Murakami et al. | 358/31 |
| 5,148,499 | 9/1992 | Matsumura | 382/54 |
| 5,168,375 | 12/1992 | Reisch et al. | 358/432 |
| 5,202,670 | 4/1993 | Oha | 340/728 |
| 5,235,410 | 8/1993 | Hurley | 358/13 |
| 5,253,043 | 10/1993 | Gibson | 358/21 R |
| 5,301,266 | 4/1994 | Kimura | 395/139 |
| 5,323,232 | 6/1994 | Otaka et al. | 348/472 |
| 5,657,082 | 8/1997 | Harada et al. | 348/262 |
| 5,677,892 | 10/1997 | Gulumay et al. | 367/38 |

FOREIGN PATENT DOCUMENTS

| | | | |
|---|---|---|---|
| 0 440 794 | 8/1991 | European Pat. Off. | G06F 15/66 |
| 0 696 780 | 2/1996 | European Pat. Off. | G06T 3/40 |
| 0 698 991 | 2/1996 | European Pat. Off. | H04N 1/047 |

OTHER PUBLICATIONS

Pitas, Digital Image Processing Algorithms, pp. 167–171, 1993.

Interpolation Using the Discrete Cosine Transform, J.I. Agbinya, Electronics Letters, Sep. 24, 1992, vol. 28, No. 20 pp. 1927–1928.

Primary Examiner—John Barlow
Assistant Examiner—Patrick Assouad
Attorney, Agent, or Firm—Sughrue, Mion, Zinn, Macpeak & Seas, PLLC

[57] ABSTRACT

In a digital image recording apparatus, an image processing is carried out on a first digital image signal obtained by sampling at a predetermined density an image signal representing an original image. The image processing is for increasing the amount of information carried by the first digital image signal and reducing frequency components of the first digital image signal which are higher than the Nyquist rate of the first digital image signal, thereby obtaining a second digital image signal. The second digital image signal is reproduced on a recording medium at a density higher than the predetermined density, thereby forming an image which is higher in resolution than that obtained from the first digital image signal and equal to that obtained from the first digital image signal in size.

3 Claims, 17 Drawing Sheets

FIG.8

| | | | | | | | | | |
|---|---|---|---|---|---|---|---|---|---|
| A00 | A01 | A02 | A03 | A04 B0 | A05 | A06 | A07 | A08 | A09 |
| A10 | A11 | A12 | A13 | A14 B1 | A15 | A16 | A17 | A18 | A19 |
| A20 | A21 | A22 | A23 | A24 B2 | A25 | A26 | A27 | A28 | A29 |
| A30 | A31 | A32 | A33 | A34 B3 | A35 | A36 | A37 | A38 | A39 |
| A40 | A41 | A42 | A43 | A44 B4 | A45 | A46 | A47 | A48 | A49 |
| | | | | C D | | | | | |
| A50 | A51 | A52 | A53 | A54 B5 | A55 | A56 | A57 | A58 | A59 |
| A60 | A61 | A62 | A63 | A64 B6 | A65 | A66 | A67 | A68 | A69 |
| A70 | A71 | A72 | A73 | A74 B7 | A75 | A76 | A77 | A78 | A79 |
| A80 | A81 | A82 | A83 | A84 B8 | A85 | A86 | A87 | A88 | A89 |
| A90 | A91 | A92 | A93 | A94 B9 | A95 | A96 | A97 | A98 | A99 |

F4

| 0.089 | -0.0310 | 0.0752 | -0.1770 | 0.6239 | 0.6239 | -0.1770 | 0.0752 | -0.0310 | 0.089 |
|---|---|---|---|---|---|---|---|---|---|

- ● SAMPLING POINT
- ○ INTERPOLATED POINT     $Bn = \sum_{i=0}^{9} Ki \times Ani$    (a)
- ○ INTERPOLATED POINT     $C = \sum_{i=0}^{9} Ki \times Ai4$    (b)
- ◉ INTERPOLATED POINT     $D = \sum_{i=0}^{9} Ki \times Bi$    (c)

$Ki = (0.089, -0.0310, 0.0752, -0.1770, 0.6239, 0.6239, -0.1770, 0.0752, -0.0310, 0.0089)$

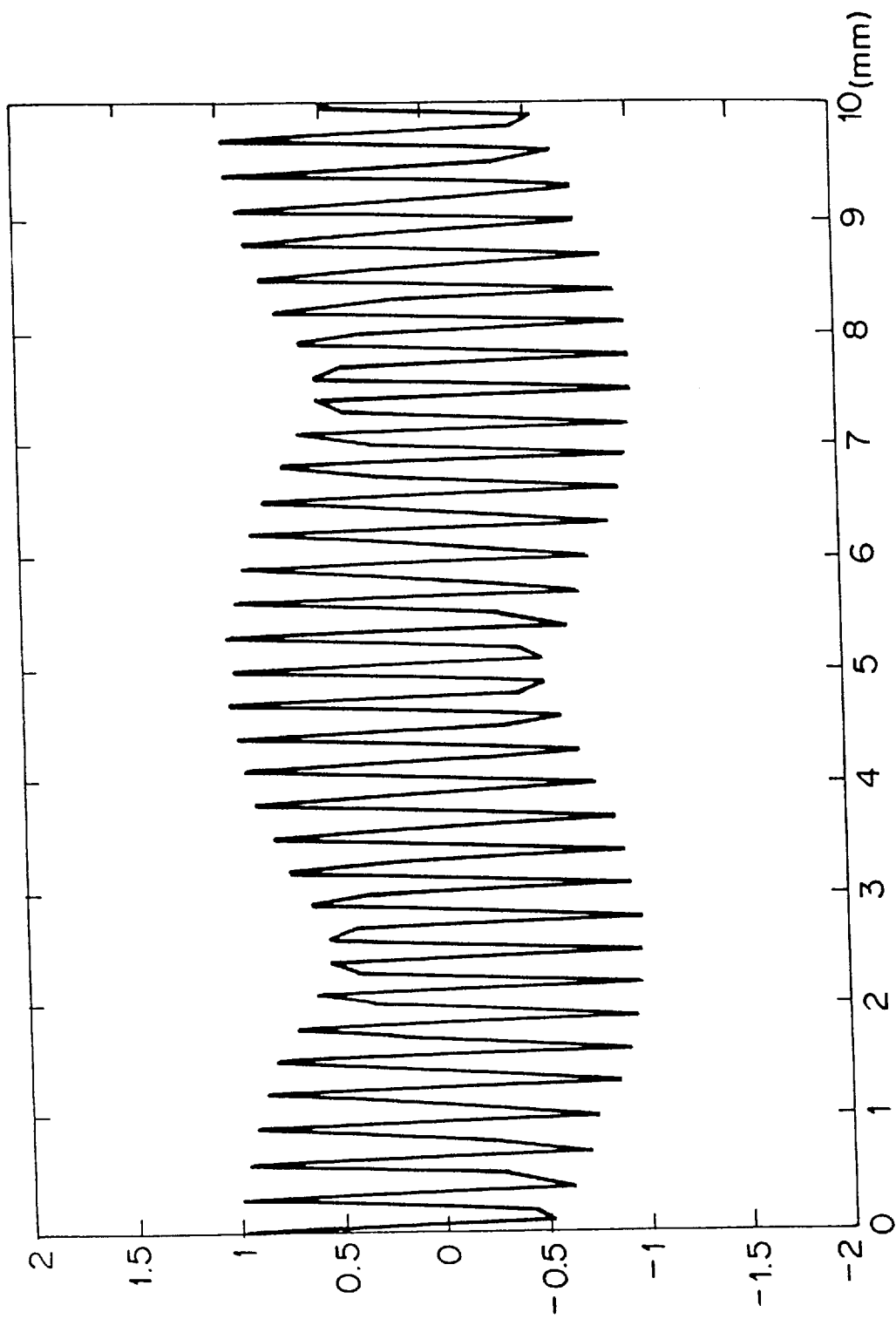

DIGITAL IMAGE RECORDING APPARATUS AND METHOD

BACKGROUND OF THE INVENTION

1. Field of the Invention

This invention relates to a digital image recording apparatus and a digital image recording method. More particularly, this invention relates to an apparatus and method for visually completely restoring on a recording medium image information components at frequencies not higher than the Nyquist rate.

2. Description of the Related Art

Image recording apparatus for recording a digital image in an actual size or to an enlarged or reduced scale, such as laser printers, thermal printers and the like, are known. In such an image recording apparatus, a digital image signal obtained by sampling an analog image signal is subjected to a predetermined image processing, for instance, to an interpolation processing, in the case where the image is to be enlarged and then reproduced on an image recording medium.

Recording by the image recording apparatus is equivalent to restoring a digital image signal as an analog image signal. As a theorem for restoring such a digital signal, a sampling theorem is known. The sampling theorem defines a condition on sampling intervals for completely restoring the digital signal as an analog signal. For example, in a one-dimensional sampling theorem, it has been proven that when an analog signal is sampled at a sampling frequency N (sampling intervals of 1/N), the signal components at frequencies not higher than N/2 included in the analog signal can be completely restored. The frequency of N/2 is generally referred to as "the Nyquist rate". Further is known that when a digital signal including therein frequency components higher than the Nyquist rate is restored to an analog signal, error occurs due to folding of a high frequency side part toward a low frequency side (aliasing error), thereby causing the shape of the restored analog signal to be greatly deformed. As for an image signal, a two-dimensional sampling theorem shows that the signal components at frequencies not higher than the Nyquist rate can be completely restored and that when a digital signal includes frequency components higher than the Nyquist rate, the digital signal cannot be completely restored as and analog signal.

Accordingly it seems that signal components at a frequency not higher than the Nyquist rate can be visually completely restored by the image recording apparatus if sampling or recording of an image is carried out on the basis of the sampling theorem. However in conventional image processing systems, signal components at frequencies not higher than the Nyquist rate actually cannot be visually completely restored in conformity with the theorem.

This is because of the following fact. That is, since the sampling theorem assumes that the original waveform can be restored by convoluting a sinc function ((sin x)/x) in sampled values, the response to recording of the recording medium must be a sinc function in order to record an image according to the sampling theorem. In other words, the recording medium must be such that a picture element is recorded on the recording medium at a density corresponding to a value which is obtained by convoluting the sinc function in a value of a given digital signal component. However since the sinc function can take on a negative value whereas the response of recording on a recording medium cannot be negative, the sinc function cannot truly be convoluted.

That is, it is actually impossible to visually completely restore the signal components at frequencies not higher than the Nyquist rate on a recording medium. However since the sampling theorem has been widely known and because various systems other than recording systems are designed according to the sampling theorem, the image recording apparatus has been expected, as if natural, to be able to visually completely restore the signal components of frequencies not higher than the Nyquist rate according to the sampling theorem.

SUMMARY OF THE INVENTION

In view of the foregoing observations and description, the primary object of the present invention is to provide a digital image recording apparatus and method which can visually completely restore digital image signal components of frequencies not higher than the Nyquist rate included in a digital image signal.

The digital image recording apparatus of the present invention comprises an image processing means which carries out an image processing on a first digital image signal obtained by sampling at a predetermined density an image signal representing an original image. This image processing increases the amount of information carried by the first digital image signal and reduces frequency components of the first digital image signal which are higher than the Nyquist rate of the first digital image signal, thereby obtaining a second digital image signal. The digital image recording apparatus of the present invention also including, a high density recording means which reproduces the second digital image signal on a recording medium at a density higher than said predetermined density, thereby forming an image which is higher in resolution than that obtained from the first digital image signal and equal in side to that obtained from the first digital image signal.

According to a first preferred embodiment, the image processing means comprises an image information increasing means which increases the amount of information carried by the first digital image signal by interpolating predetermined values into the first digital image signal according to a predetermined rule. This preferred embodiment also includes a frequency analysis means which analyzes the frequency components of the first digital image signal by carrying out a first transformation processing on the first digital image signal increased with the amount of information carried thereby and developing the first digital image signal in a frequency space. This preferred embodiment further includes a high frequency component removing means which replaces the values of the frequency components higher than the Nyquist rate of the first digital image signal with 0 in the frequency space in which the first digital image signal is developed by the frequency analysis means and obtains said second digital image signal. Additionally, this preferred embodiment includes an inverse transformation means which carries out a second transformation processing inverse to the first transformation processing on the second digital image signal obtained by the high frequency component removing means in said frequency space.

According to a second preferred embodiment, the image processing means may comprise a frequency analysis means which analyzes the frequency components of the first digital image signal by carrying out a first transformation processing on the first digital image signal and developing the first digital image signal in a frequency space. The second preferred embodiment also includes an image information increasing means which increases the amount of information carried by the first digital image signal developed in the frequency space and obtains said second digital image signal by interpolating 0 into the first digital image signal so that values of the frequency components higher than the Nyquist rate of the first digital image signal become 0 in the frequency space. The second preferred embodiment further includes and an inverse transformation means which carries out a second transformation processing inverse to the first transformation processing on the second digital image signal obtained by the image information increasing means in said frequency space.

According to a third preferred embodiment, the image processing means may comprise such a means that obtains the second digital image signal by carrying out an interpolation processing on the first digital image signal by use of a filter which satisfies the condition $R(f) \leq 0.2$ in at least 80% of the region where $N/2 < f \leq N$, wherein $N/2$ represents the Nyquist rate of the first digital image signal, f represents the frequency and $R(f)$ represents the properties of the filter.

The method of the present invention is a digital image recording method which is carried out by the digital image recording apparatus described above and comprises two steps. The first step is to carry out an image processing on a first digital image signal obtained by sampling at a predetermined density an image signal representing an original image, the image processing being for increasing the amount of information carried by the first digital image signal and reducing frequency components of the first digital image signal which are higher than the Nyquist rate of the first digital image signal, thereby obtaining a second digital image signal. The second step is to reproduce the second digital image signal on a recording medium at a density higher than said predetermined density, thereby forming an image which is higher in resolution than that obtained from the first digital image signal and equal to that obtained from the first digital image signal in size.

Preferably the image processing step (i.e., the first step) comprises the substeps of (1) increasing the amount of information carried by the first digital image signal by interpolating predetermined values into the first digital image signal according to a predetermined rule, (2) analyzing the frequency components of the first digital image signal by carrying out a first transformation processing on the first digital image signal increased with the amount of information carried thereby and developing the first digital image signal in a frequency space, (3) obtaining said second digital image signal by replacing the values of the frequency components higher than the Nyquist rate of the first digital image signal with 0 in the frequency space in which the first digital image signal is developed, and (4) carrying out a second transformation processing inverse to the first transformation processing on the second digital image signal.

Alternatively, the image processing may step (i.e., the first step) comprise the substeps of (1) analyzing the frequency components of the first digital image signal by carrying out a first transformation processing on the first digital image signal and developing the first digital image signal in a frequency space, (2) obtaining said second digital image signal in the frequency space by increasing the amount of information carried by the first digital image signal developed in the frequency space by interpolating 0 into the first digital image signal so that values of the frequency components higher than the Nyquist rate of the first digital image signal become 0, and (3) carrying out a second transformation processing inverse to the first transformation processing on the second digital image signal.

As a further alternative, the image processing step (i.e., the first step) may comprise the step of obtaining the second digital image signal by carrying out an interpolation processing on the first digital image signal by use of a filter which satisfies the condition $R(f) \leq 0.2$ in at least 80% of the region where $N/2 < f \leq N$, wherein $N/2$ represents the Nyquist rate of the first digital image signal, f represents the frequency and $R(f)$ represents the properties of the filter.

In this specification, the expression "reducing frequency components of the first digital image signal which are higher than the Nyquist rate of the first digital image signal" should be broadly interpreted to include complete removal of such frequency components in addition to reduction of such frequency components.

Further the expression "interpolating predetermined values into the first digital image signal according to a predetermined rule" is defined to mean a processing, for instance, for interpolating a predetermined value (e.g., 0) into the first digital image signal every other picture element and line and the processing may be carried out according to any rule and by use of any value so long as it can increase the amount of information carried by the first digital image signal. These factors may be determined as matter of design.

The term "transformation processing" is defined as an orthogonal transformation processing such as a Fourier transformation widely known as a method of frequency analysis. According, the expression "developing the first digital image signal in a frequency space" means to obtain a Fourier transformation image by carrying out Fourier transformation on the first digital image signal. The expression "second transformation processing inverse to the first transformation processing" means, for instance, an inverse Fourier transformation. However since the first transformation processing is carried out in order to visually clear the frequency components of the first digital image signal, any transformation known as a method of frequency analysis may be employed without being limited to the Fourier transformation.

On a Fourier transformation image, the value of each frequency component of the digital image signal is given as a value of a coordinate (position) and the expression "replacing the values of the frequency components higher than the Nyquist rate of the first digital image signal with 0" is defined to mean to replace the values of the positions with 0.

Further the expression "interpolating 0 into the first digital image signal so that values of the frequency components higher than the Nyquist rate of the first digital image signal become 0" means to make 0 the values of positions representing frequency components higher than the Nyquist rate of the first digital image signal on a Fourier transformation image. However the "interpolation of 0" differs from the "replacement with 0" described above in that by interpolation of 0 into a given position, the original value for the position is shifted to another position representing a frequency component not higher than the Nyquist rate and as a result, an enlarged Fourier transformation image is obtained. That is, by "replacement with 0", the amount of information carried by the first digital image signal is left unchanged whereas by "interpolation of 0", the amount of information carried by the first digital image signal is increased.

Further the expression "carrying out an interpolation processing on the first digital image signal by use of a filter" means to carry out, in addition to a normal filtering processing for obtaining values corresponding to picture elements originally contained in the first digital image signal, a processing for obtaining values to be interpolated among the original picture elements by the similar filtering and interpolating the values among the original picture elements. By this processing, the amount of information carried by the first digital image signal is increased.

In accordance with the present invention, the amount of information carried by the first digital image signal is increased and the frequency components higher than the Nyquist rate of the first digital image signal are removed from the first digital image signal, and the second digital image signal thus obtained is reproduced on a recording medium at a density higher than sampling density in a size substantially equal to that of the original image though the amount of information carried by the second digital image signal is larger than that carried by the first digital image signal. Accordingly, image information among the sampling points which has conventionally been lost can be compensated without involving the frequency components higher than the Nyquist rate, which makes it feasible to precisely restore the digital image signal on a recording medium.

When the amount of information carried by the first digital image signal is increased by interpolating predetermined values into the first digital image signal according to a predetermined rule and then the first digital image signal having an increased amount of information is developed in a frequency space by a Fourier transformation or the like, the frequency components in the digital image signal can be visually cleared. Accordingly, the frequency components higher than the Nyquist rate can be easily removed. By thereafter carrying out an inverse Fourier transformation or the like, a digital image signal with supplemented information is obtained.

The same effect can be obtained by enlarging the Fourier transformation image so that no frequency component higher than the Nyquist rate is included therein. In this case, since the Fourier transformation is carried out before the amount of information carried by the digital image signal is increased, the amount of operation for the Fourier transformation is less. As a result, the load on the system can be reduced.

Further when values to be interpolated among the original picture elements are obtained and interpolated among the original picture elements by carrying out a filtering processing on the digital image signal without developing the digital image signal in a frequency space, the same effect can be obtained and at the same time, load on the system can be reduced even further.

BRIEF DESCRIPTION OF THE DRAWINGS

FIG. 8 is a view for illustrating an example of interpolation processing with a filter in the third embodiment, FIG. 17 is a view showing an example of image signal recorded in accordance with the method similar to the third embodiment but by use of a filter which does not satisfy the condition of the present invention.

DESCRIPTION OF THE PREFERRED EMBODIMENTS

FIGS. 1 to 10 are for illustrating three embodiments of the present invention, and FIGS. 11 to 17 show image signals to be processed or processed by the image recording apparatuses in accordance with the embodiments of the present invention or in accordance with a prior art. In FIGS. 11 to 17, the abscissa represents the position on a line of an image and the ordinate represents the density of the image.

Figure 11:
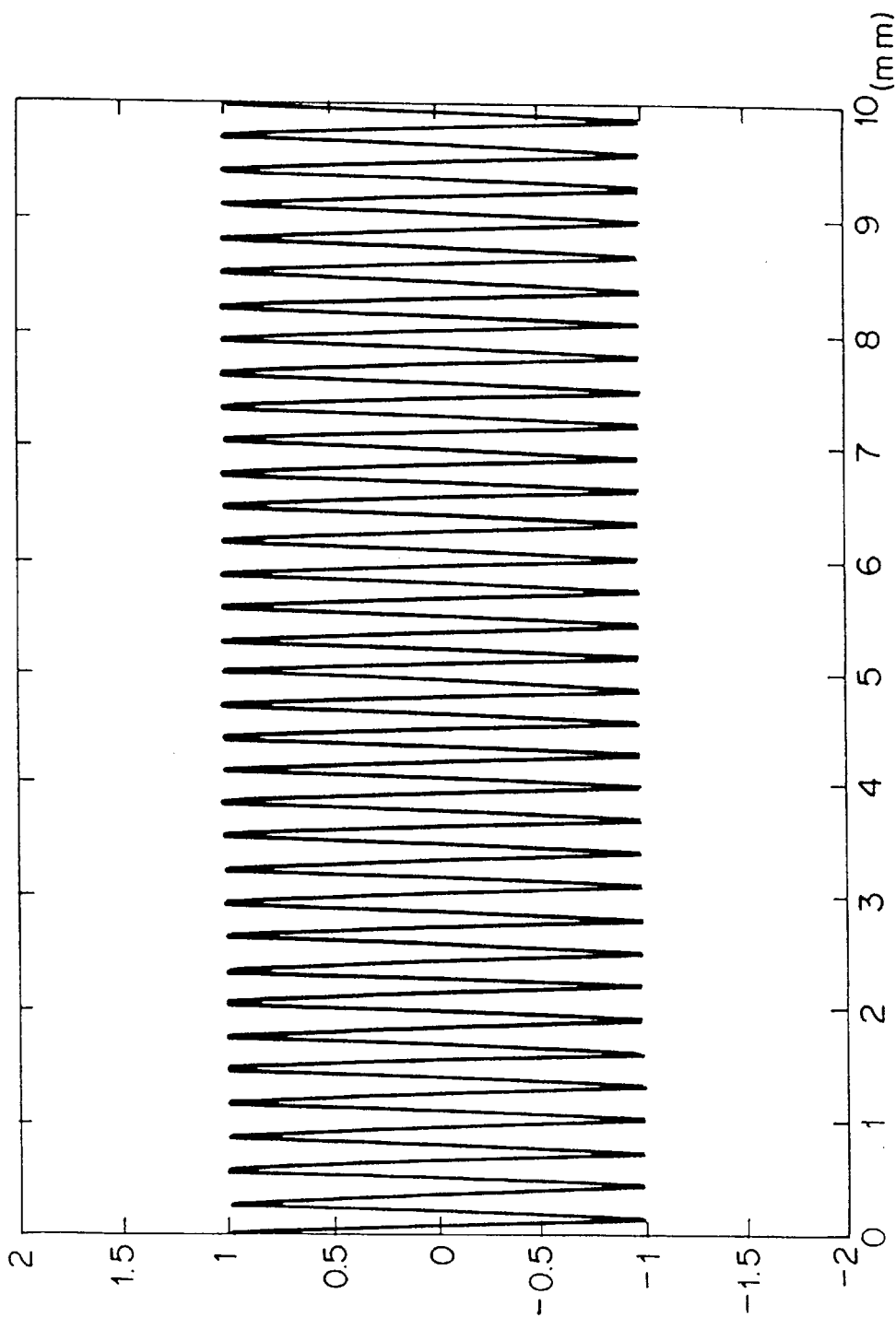
FIG. 11 is a view showing an example of original image signal.
Figure 12:
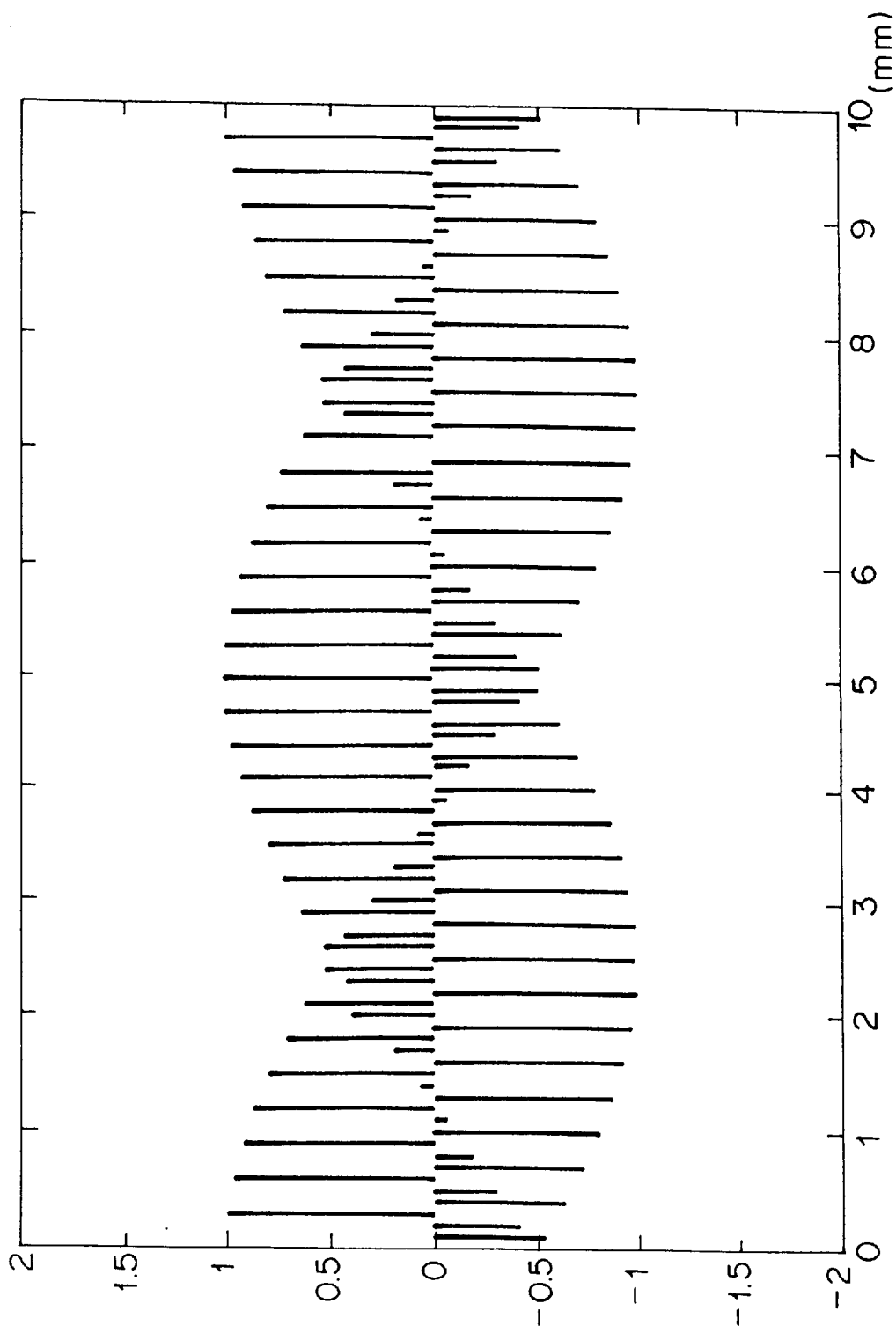
FIG. 12 is a view showing a digital image signal obtained by sampling the original image signal shown in FIG. 11.

FIG. 11 shows an example of an original image signal whose frequency is 3.4 cycle/mm, and FIG. 12 shows a digital image signal obtained by sampling the image signal shown in FIG. 11 at 10 pixel/mm (10 sampling points per 1 mm). Description will be made of the case where the digital image signal shown in FIG. 12 is subjected to an image processing and the processed digital image signal is reproduced on a recording medium.

Reproduction of the digital image signal shown in FIG. 12 by a conventional image recording apparatus will be described first. Since the sampling frequency of the digital image signal is 10 pixel/mm as described above, the Nyquist rate of this digital image signal is 5 cycle/mm. Accordingly the original image signal whose frequency is 3.4 cycle/mm does not contain frequency components higher than the Nyquist rate of the digital image signal and theoretically can be completely restored.

Figure 16:
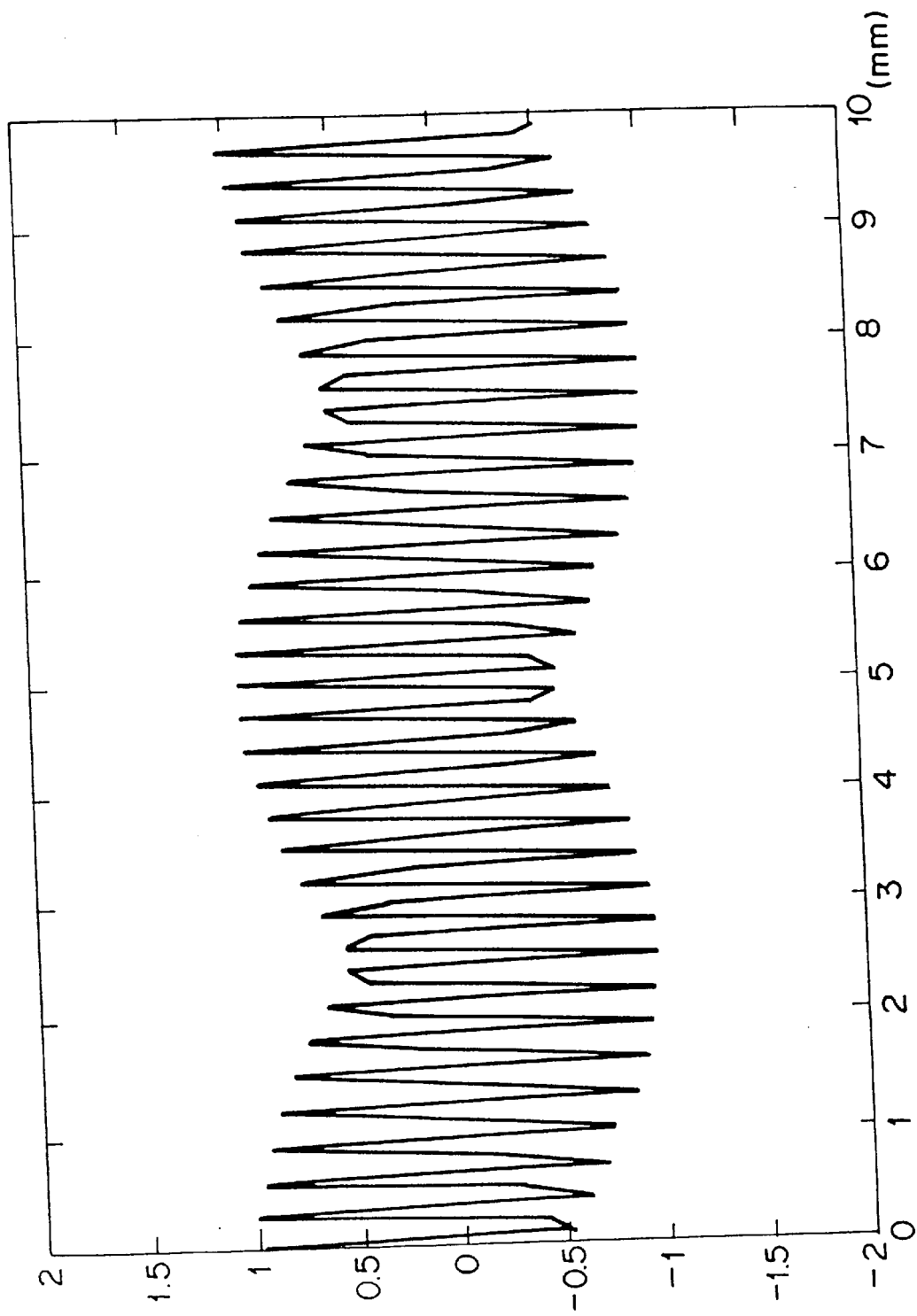
FIG. 16 is a view showing an example of image signal recorded by a conventional image recording apparatus.

However as described above, since the recording response cannot be a sinc function to light (in the case of a laser printer) nor heat (in the case of a thermal printer), actually the original image signal cannot be completely restored. The signal shown in FIG. 16 is an example where the digital image signal shown in FIG. 12 is reproduced in the same size as the original image by the conventional image recording apparatus. As can be seen from FIG. 16, even the digital image signal which does not contain frequency components higher than the Nyquist rate is reproduced as a signal very different from the original image signal.

Figure 1:
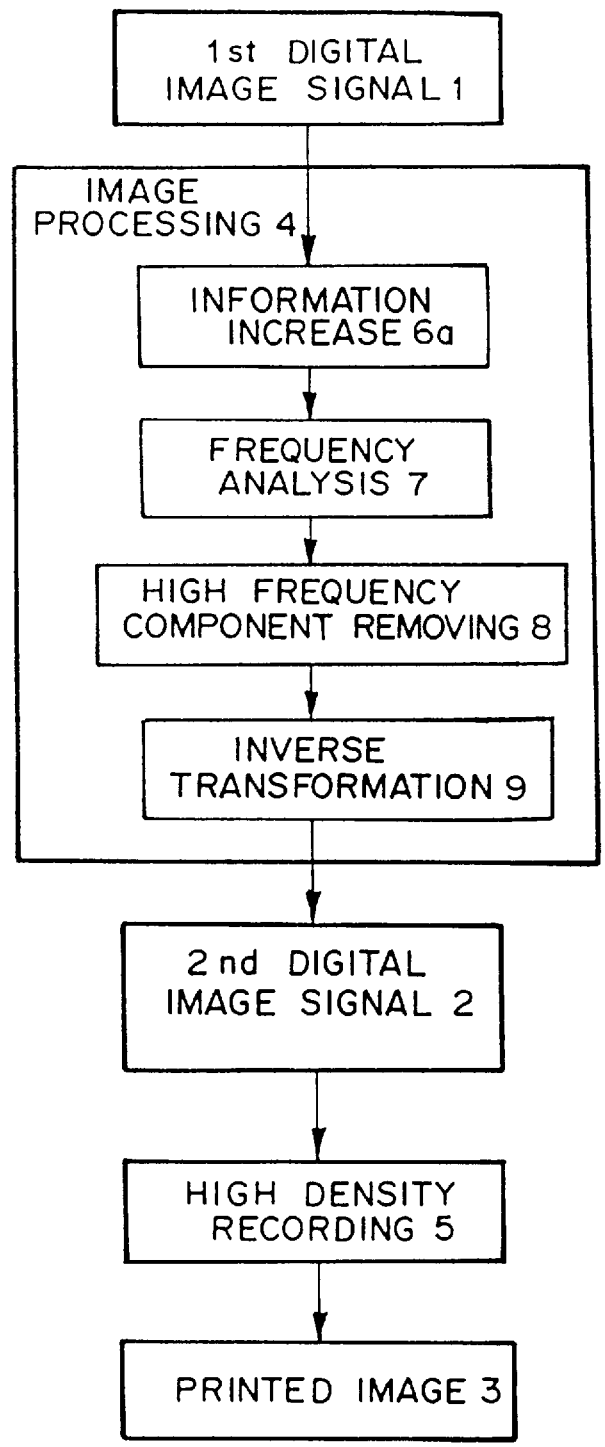
FIG. 1 is a view for briefly illustrating an image recording apparatus in accordance with a first embodiment of the present invention.

FIG. 1 illustrates an image recording apparatus and an image recording method in accordance with a first embodiment of the present invention. As shown in FIG. 1, the image recording apparatus of this embodiment comprises an image processing means 4 which carries out a predetermined image processing on a first digital image signal 1 obtained by sampling an original image signal representing an original image at a predetermined sampling density and thereby obtains a second digital image signal 2, and a high density recording means 5 which reproduces the second digital image signal 2 at a density higher than the sampling density as a printed image 3.

Figure 2:
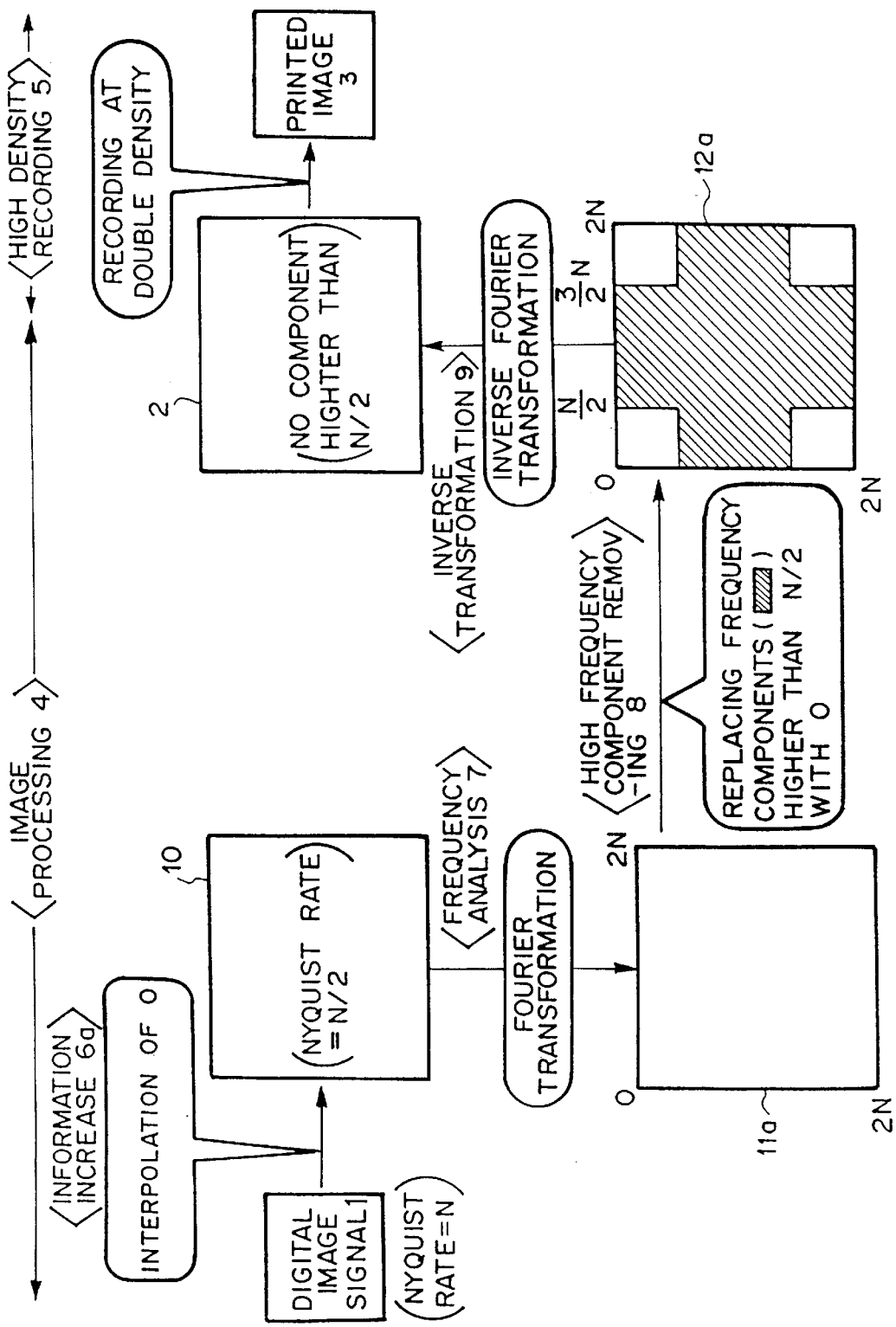
FIG. 2 is a view for illustrating the operation of the image processing means employed in the first embodiment.

The predetermined image processing carried out by the image processing means 4 increases the amount of information to be carried by the first digital image signal 1 and reduces frequency components of the first digital image signal 1 which are higher than the Nyquist rate of the first digital image signal 1. In this particular embodiment, the image processing means 4 comprises an image information increasing means 6a, a frequency analysis means 7, a high frequency component removing means 8' and an inverse transformation means 9' as shown in FIG. 2.

In this embodiment, the image information increasing means 6a increases the amount of information carried by the first digital image signal 1 by interpolating 0 into the first digital image signal 1 every other picture element and every other line. This results in doubling of information in each of the transverse and longitudinal directions, i.e., a four-fold increase in total. This is equivalent to doubling the sampling points, and accordingly the Nyquist rate of the resultant digital image signal 10 is twice the Nyquist rate N/2 of the first digital image signal 1 and is equal to N. At the same time, by the interpolation processing, the frequency components of the digital image signal vary. That is, even if the first digital image signal 1 does not contain frequency components higher than the Nyquist rate N/2, the resultant digital image signal 10 can contain such frequency components. Since the frequency components higher than the Nyquist rate adversely affect restoring the digital image signal, as described above, such frequency components should be removed.

The frequency components in the resultant digital image signal 10 are visually made clear by carrying out a Fourier transformation on the resultant digital image signal 10 and obtaining a Fourier transformation image 11a thereof by the frequency analysis means 7. The frequency components higher than the Nyquist rate N/2 of the first digital image signal 1 are then removed by replacing values of the frequency components with 0 by the high frequency component removing means 8. This produces a Fourier transformation image 12a, shown in FIG. 2, which is free from the high frequency components. In this particular embodiment, a discrete Fourier transformation (DFT) is carried out using a fast Fourier transformation (FFT) algorithm as the relevant Fourier transformation. A discrete Fourier transformation image has been known to be represented by repetition of Fourier transforms of a continuous signal, and in accordance with this method of representation, the hatched portion of the Fourier transformation image 12a represents the frequency components higher than the Nyquist rate N/2 of the first digital image signal 1.

When an inverse Fourier transformation is subsequently carried out on the Fourier transformation image 12a free from the high frequency components by the inverse transformation means 9, a second digital image signal 2 is obtained. This second digital image signal 2 is the digital image signal 10 increased with the amount of information carried thereby minus the frequency components higher than the Nyquist rate of the first digital image signal 1. Finally by reproducing the second digital image signal 2 at the double density by means of the high density recording means 5, a printed image 3 at a high resolution is obtained.

Figure 13:
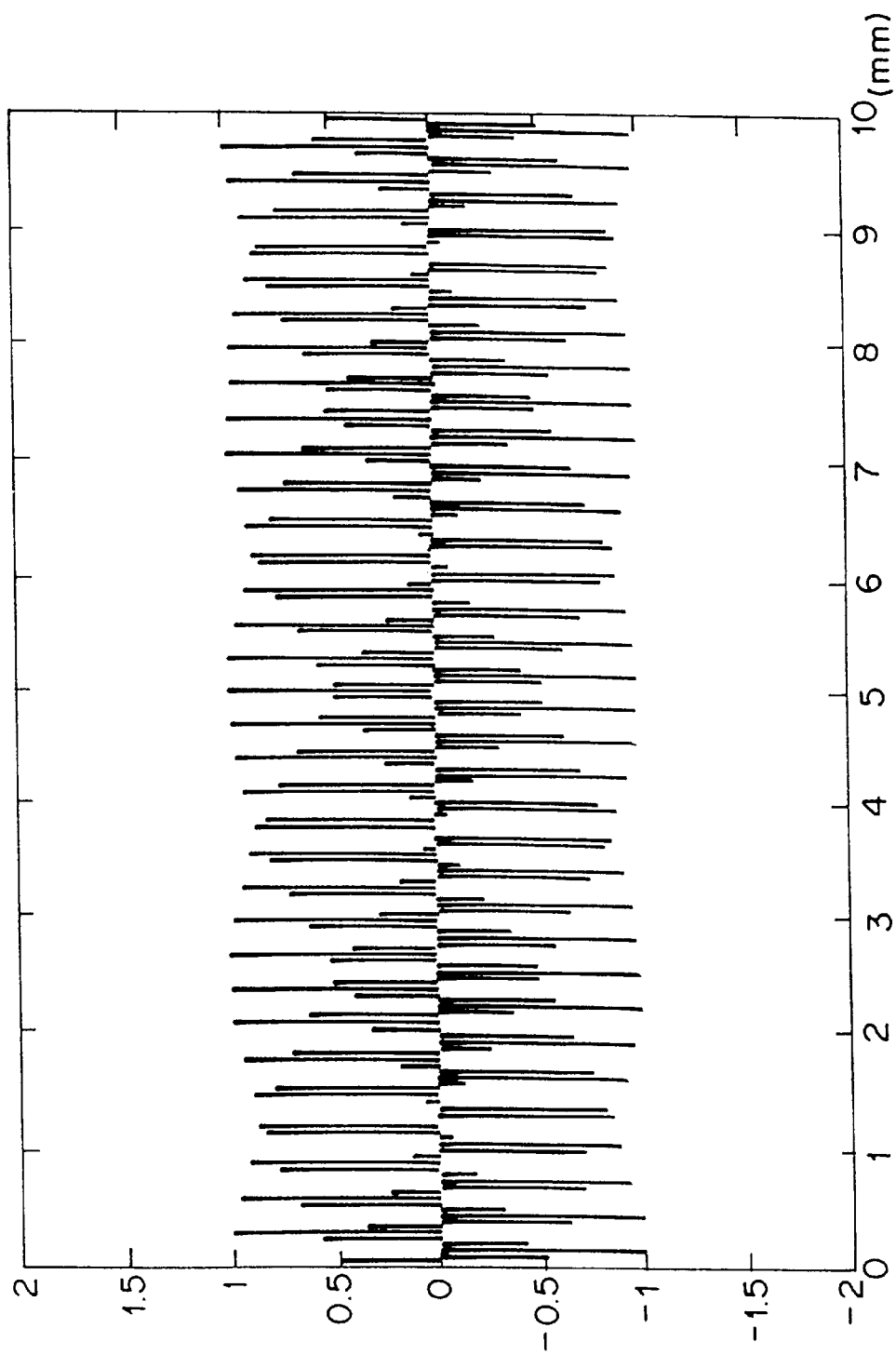
FIG. 13 is a view showing an example of second digital image signal in the first embodiment.
Figure 14:
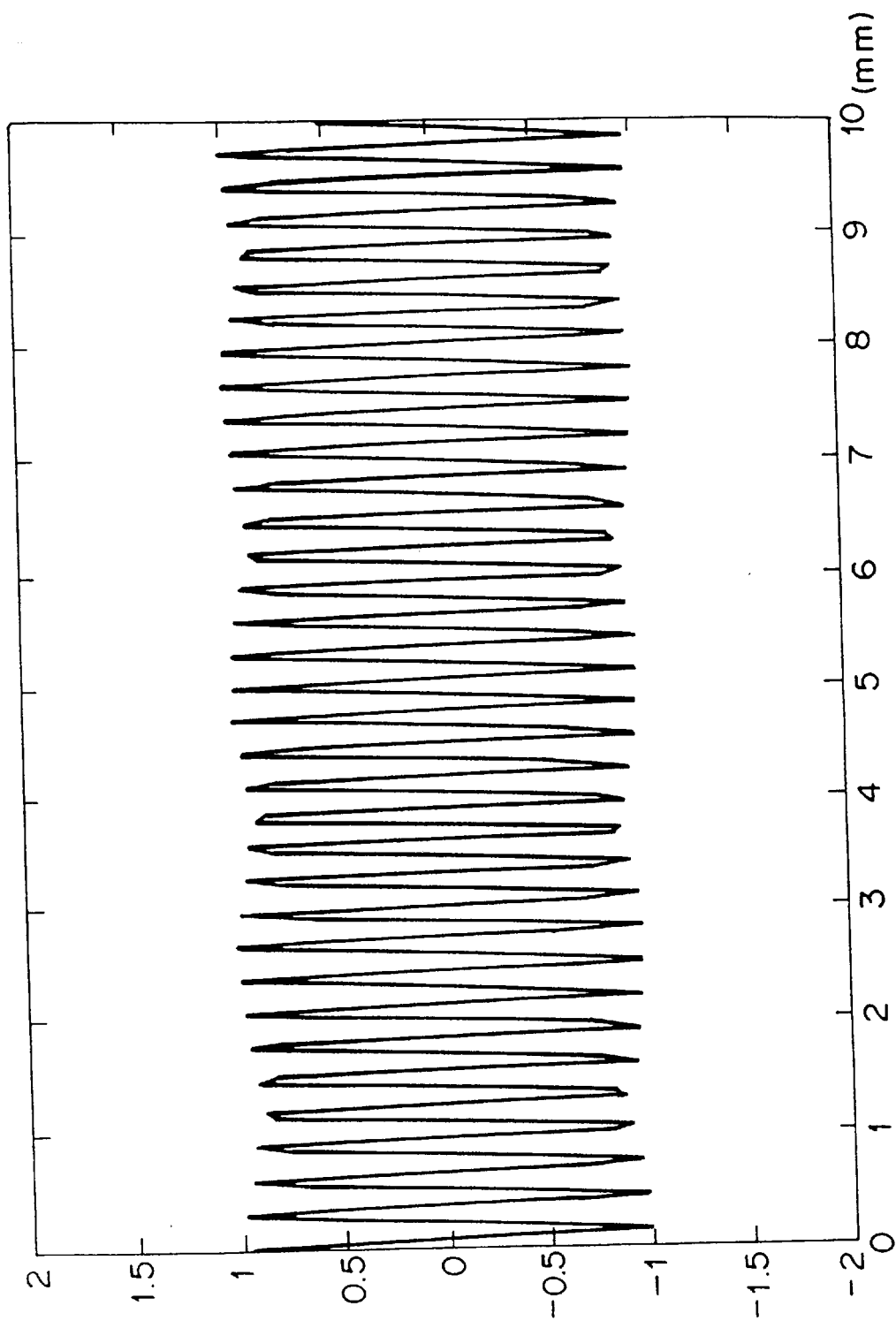
FIG. 14 is a view showing a result of the first embodiment.

In order to prove the effect of the present invention, a case where the original image signal shown in FIG. 11 is processed by the image recording apparatus on this embodiment will be described, hereinbelow. A second digital image signal 2 obtained by carrying out the aforesaid processing on the digital image signal shown in FIG. 12 obtained by sampling the original image signal shown in FIG. 11 is as shown in FIG. 13, and the signal obtained by recording the second digital image signal 2 at a high density is as shown in FIG. 14. From comparison of the original image signal shown in FIG. 11, the image signal shown in FIG. 14 and the image signal shown in FIG. 16 which is restored by the conventional image recording apparatus, it can be seen that the image signal restored by the image recording apparatus of this embodiment is closer to the original image signal than that restored by the conventional image recording apparatus and is free from fluctuation which is seen in the image signal restored by the conventional image recording apparatus. The image signal restored by the image recording apparatus of this embodiment may be considered to be a faithful restoration of the original image signal.

Figure 3:
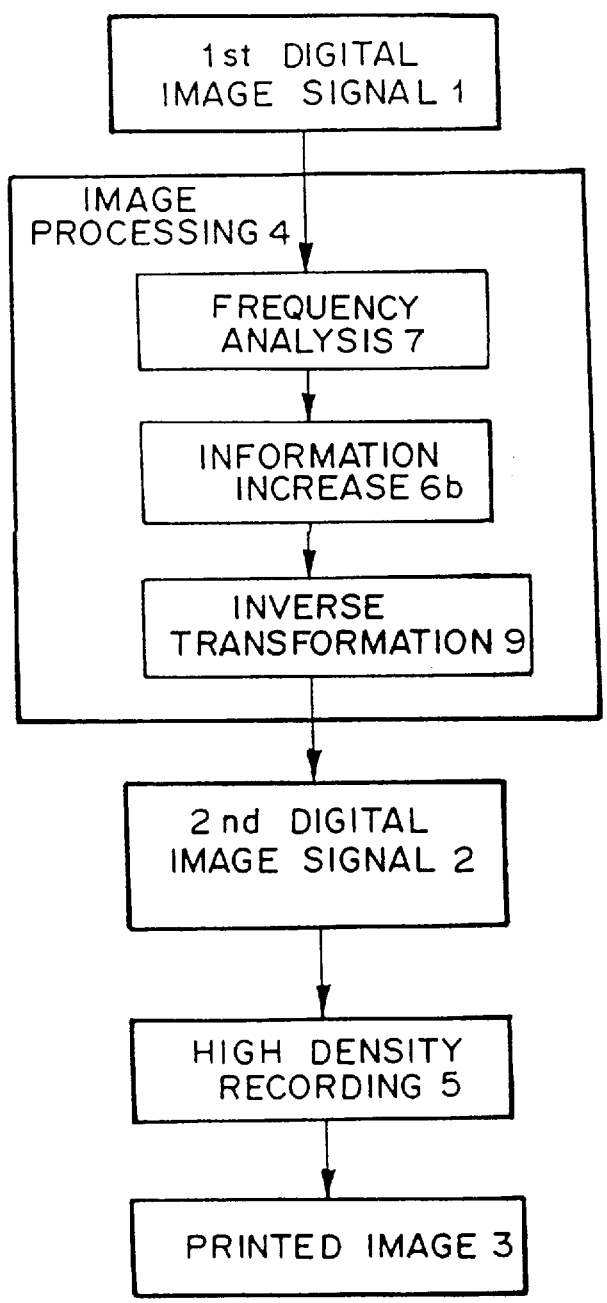
FIG. 3 is a view for briefly illustrating an image recording apparatus in accordance with a second embodiment of the present invention.
Figure 4:
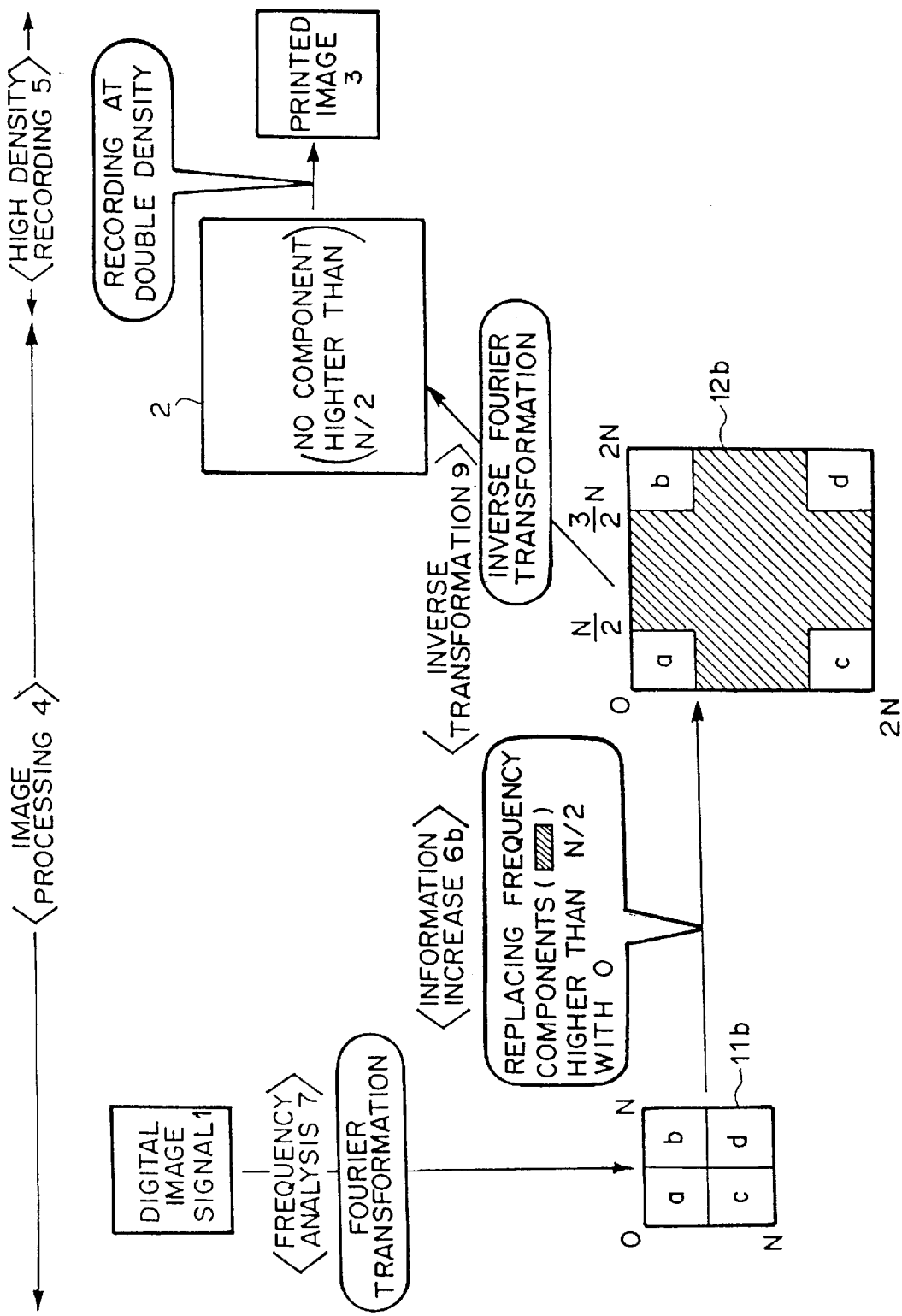
FIG. 4 is a view for illustrating the operation of the image processing means employed in the second embodiment.

FIG. 3 is a view for illustrating an image recording apparatus and an image recording method in accordance with a second embodiment of the present invention, and FIG. 4 shows a processing by the image processing means 4 in this embodiment. In this embodiment, the image processing means 4 comprises a frequency analysis means 7, an image information increasing means 6b and an inverse transformation means 9 as shown in FIG. 3. The frequency analysis means 7 and the inverse transformation means 9 will not be described in detail here since they are the same as those in the first embodiment except that the object of processing differs from that in the first embodiment.

This embodiment is characterized in that the processing for increasing the amount of information carried by the digital image signal is carried out after a Fourier transformation. That is, as shown in FIG. 4, a Fourier transformation is first carried out on the first digital image signal 1, thereby obtaining a Fourier transformation image 11b. Then the amount of information is increased by interpolating 0 into positions representing the frequency components higher than the Nyquist rate of the first digital image signal 1 in the Fourier transformation image 11b. Thereafter, as in the first embodiment, a second digital image signal 2 is obtained by carrying out an inverse Fourier transformation by the inverse transformation means 9 and the second digital image signal 2 is reproduced at the double density by means of the high density recording means 5, whereby a printed image 3 at a high resolution is obtained.

The printed image 3 obtained by the second embodiment is equivalent in quality to that obtained by the first embodiment in quality. However the second embodiment is advantageous over the first embodiment because the Fourier transformation is carried out before the amount of information carried by the digital image signal is increased. As a result the amount of operation for the Fourier transformation is greatly reduced. Generally, when operation for a Fourier transformation is executed by a computer, the computing time is not always proportional to the size of the image. That is, in the case where memory space is limited, processing for delivery of image information is carried out between the memory and the disk in addition to operation of the Fourier transformation. Thus accordingly as the size of the image to be processed increases, the computing time for additional processing increases. Thus the second embodiment, in which the amount of information on which the Fourier transformation is to be carried out is smaller, is advantageous over the first embodiment.

An image recording apparatus and an image recording method in accordance with a third embodiment of the present invention will be described with reference to FIGS. 5 to 10, hereinbelow. Though carrying out the Fourier transformation as described above is adequate as an image processing method, it is not always preferable from the viewpoint of performance of the apparatus. In the third embodiment, the amount of image information is increased and the frequency components higher than the Nyquist rate are reduced without carrying out a Fourier transformation.

Figure 5:
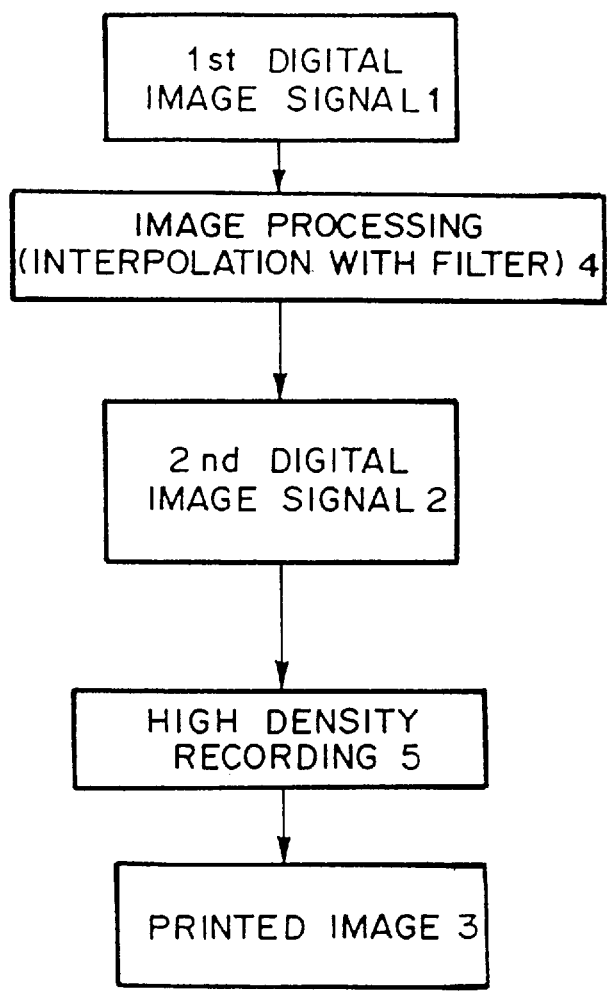
FIG. 5 is a view for briefly illustrating an image recording apparatus in accordance with a third embodiment of the present invention.
Figure 6:
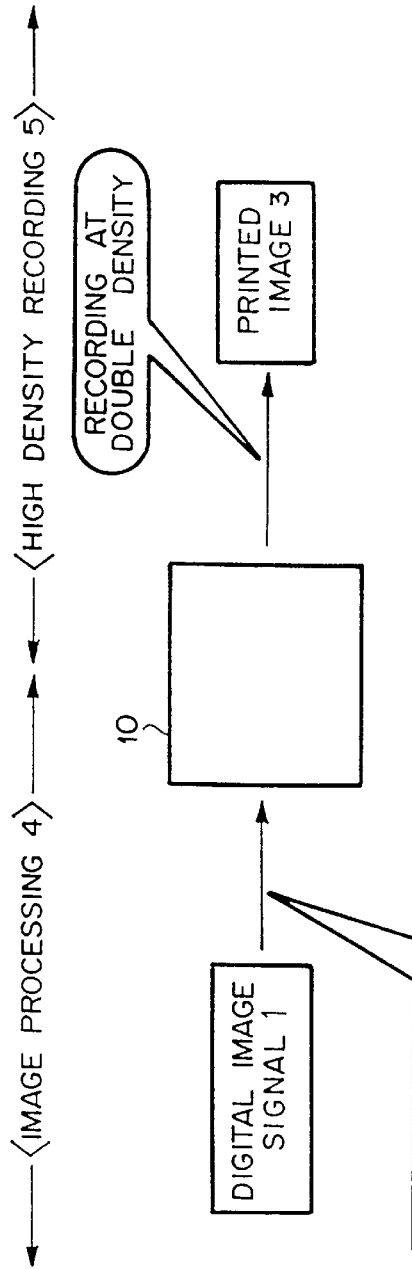
FIG. 6 is a view for illustrating the operation of the image processing means employed in the third embodiment.
Figure 7:
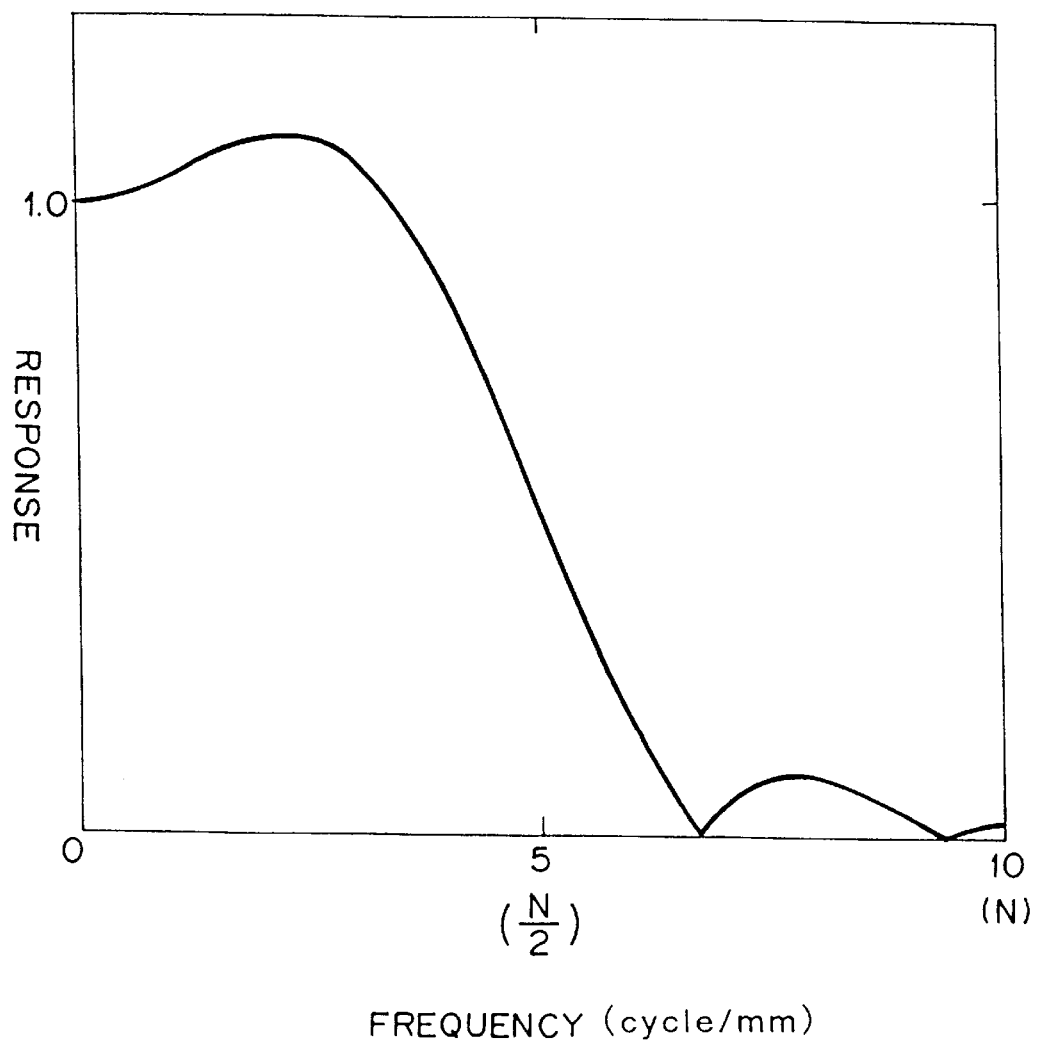
FIG. 7 is a view showing the properties of the filter F1 shown in example 1 in the third embodiment.

FIG. 5 is a view for illustrating an image recording apparatus and an image recording method in accordance with a third embodiment of the present invention. FIG. 6 shows the image processing carried out by the image processing means 4 shown in FIG. 5. As shown in FIG. 5, the image processing means 4 of this embodiment carries out an interpolation processing by use of a filter. The filter should satisfy the condition $R(f) \leq 0.2$ in at least 80% of the region where $N/2 < f \leq N$, wherein $N/2$ represents the Nyquist rate of the first digital image signal, f represents the frequency and $R(f)$ represents the properties of the filter. It is preferred that the region where $R(f) \leq 0.2$ be as close to 100% of the region where $N/2 < f \leq N$ as possible and $R(f)$ be as close to 0 as possible for each frequency in the region.

Examples of filters which satisfy the condition described above and examples of interpolation processing using such filters will be described hereinbelow. In the example 1 shown in FIG. 6, convolution is carried out by use of a filter F1 on an image interpolated with 0 every other picture element, that is, values are obtained by addition with weighting through the filter F1 while shifting the filter F1. By interpolation of 0, the amount of information obtained by the filtering processing becomes twice as large as that of the original information. In the case of the filter F1, the original picture elements and the picture elements obtained by this processing are alternated with each other. The filter F1 has response properties shown in FIG. 7 and, accordingly, the image signal obtained has less frequency components higher than the Nyquist rate as compared with the original digital image signal. The same effect can be obtained by carrying out filtering alternately using filters F2 and F3 (example 2), which are obtained by dividing the filter F1 into two pieces, without interpolation of 0.

Figure 10:
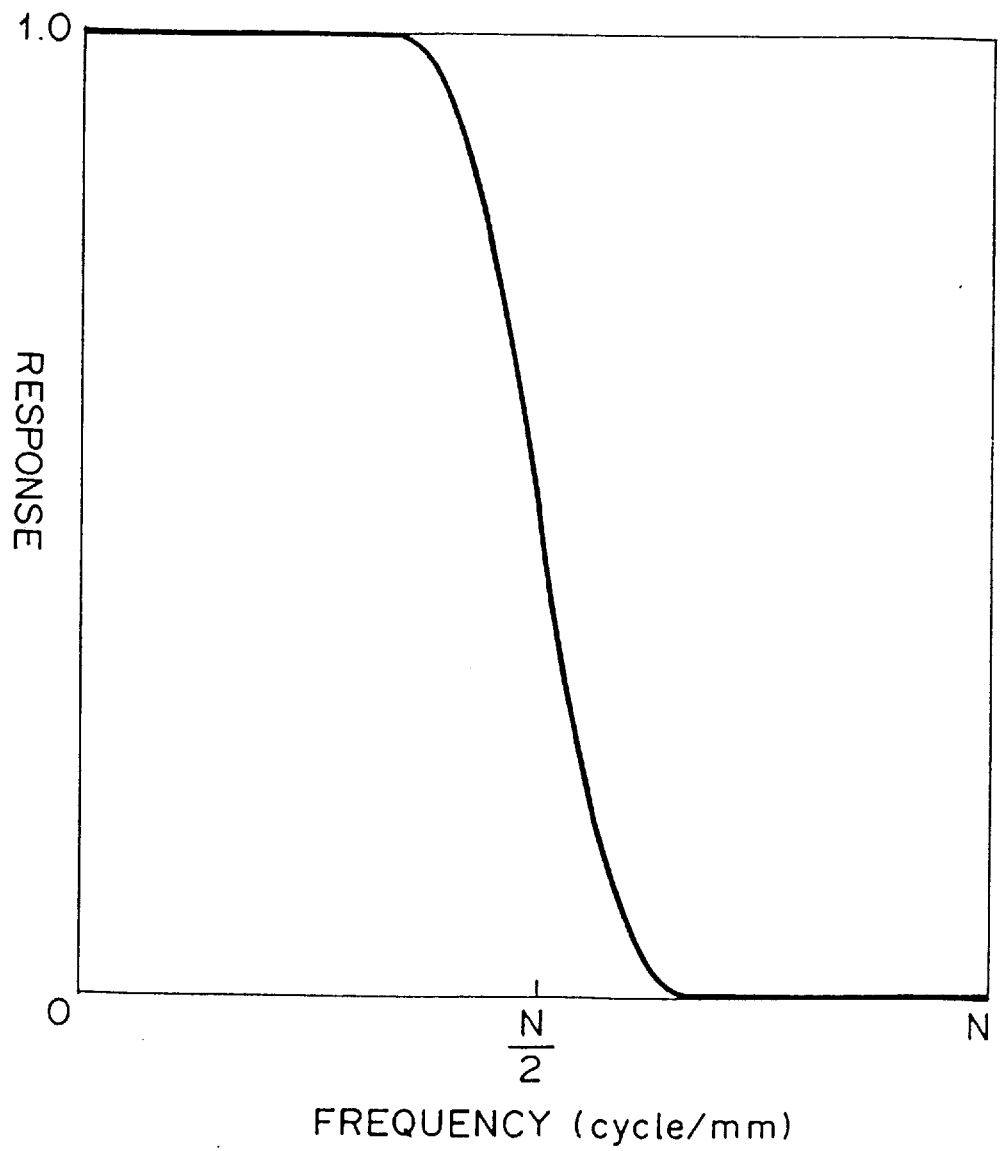
FIG. 10 is a view showing the properties of the filter F4 shown in FIG. 8.

Another example of the filter which satisfies the aforesaid condition will be described, hereinbelow. FIG. 8 shows an example of an interpolation processing using a filter F4 whose response properties are as shown in FIG. 10. In the case of processing using the filter F4, by carrying out filtering on sampling points of the original image (digital image signal components) represented by Amn (m and n stand for integers representing positions) in FIG. 8 with the filter F4, that is, by carrying out operations according to formulae (a), (b) and (c), the values of interpolated points Bmn, Cmn and Dmn are obtained. In FIG. 8, only a part of the interpolated points Bmn, Cmn and Dmn is shown.

Figure 9:
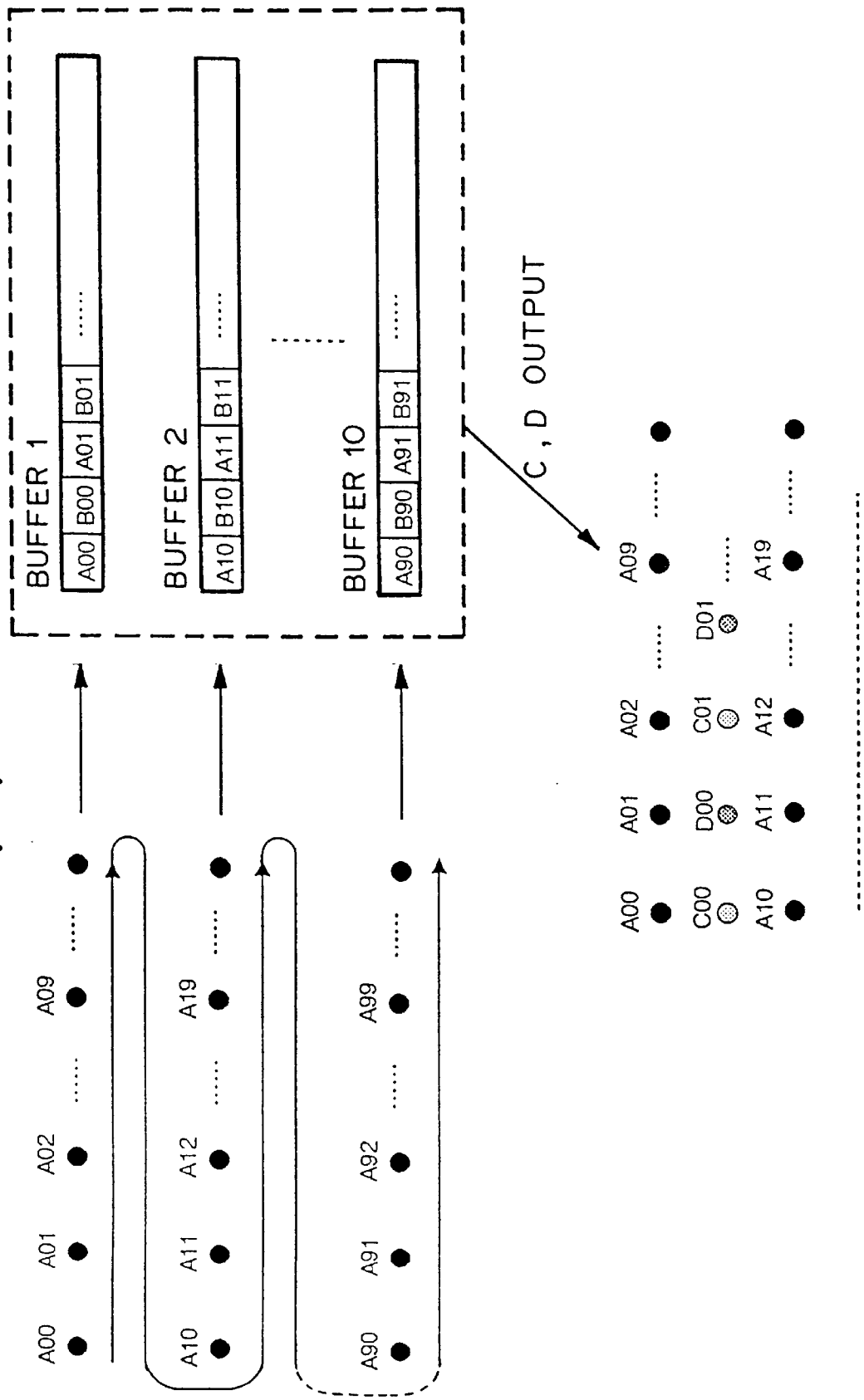
FIG. 9 is a view for illustrating the operation of the image recording apparatus of the third embodiment.

FIG. 9 shows a concrete processing carried out by the image processing means 4 which carries out the interpolation processing using the filter F4 shown in FIG. 8. The digital signal components for the respective picture elements A01 to A09, A10 to A19 . . . of the first digital image signal 1 to be processed are input into the image processing means 4 scanning-line-by-scanning-line in this order. The image processing means 4 calculates Bmn on the basis of the digital image signal components for the last ten picture elements out of the signal components input into the image processing means 4 in sequence and outputs to buffers in sequence each allotted to one line. The capacity of the buffer is such that it can store digital image signal components for twice the number of picture elements as the number of picture elements in one scanning line. That is, digital image signal components for twenty picture elements can be stored in a buffer in this particular embodiment. The values Bmn which are obtained in sequence in the manner described above and output to the buffers and the values Amn for the original picture elements alternate with each other in this example.

When the buffers for 10 scanning lines are filled, the image processing means 4 obtains Cmn and Dmn on the basis of digital image signal components stored in the corresponding positions of the buffers, that is, digital image signal components for picture elements on the same column in FIG. 8. The picture element values Amn, Bmn, Cmn and Dmn thus obtained are output in sequence in the scanning line direction. Thereafter the image processing means 4 clears the image signals in the buffer in which digital image signal components are stored first in the 10 buffers. Then digital image signal components for another line are stored in the buffer and the image processing means 4 repeats the processing described above.

Figure 15:
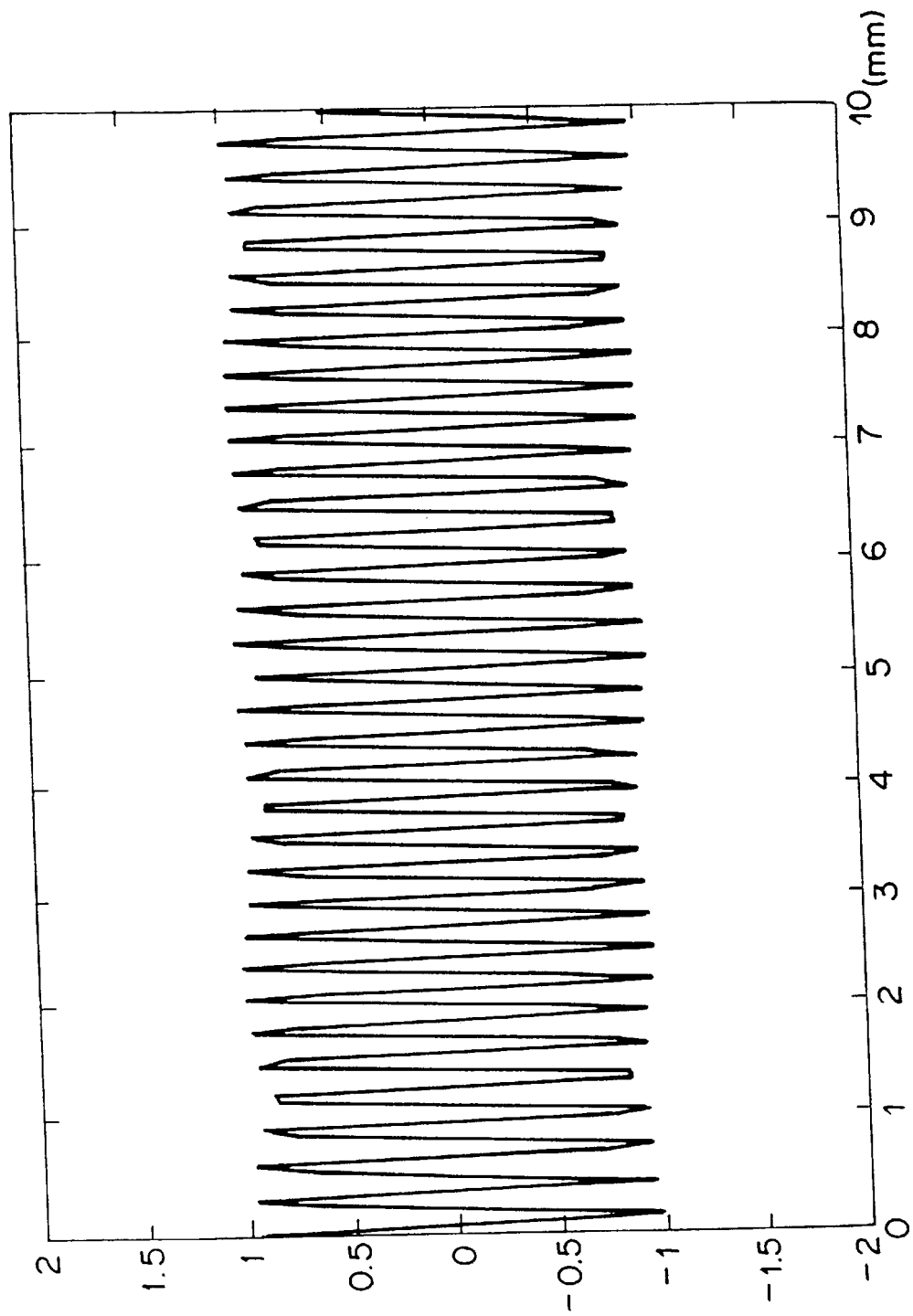
FIG. 15 is a view showing a result of the third embodiment.

The digital image signal subjected to the interpolation processing using the aforesaid filter is recorded as an image signal shown in FIG. 15. The image signal shown in FIG. 15 is more close to the original image signal than an image signal recorded by a conventional image recording apparatus (FIG. 16) and an image signal recorded in accordance with the method similar to the third embodiment but by use of a one-dimensional filter which does not satisfy the condition of the present invention (FIG. 17).

The image recording apparatus and the image recording method in accordance with the present invention need not be limited to the embodiments described above but the embodiments may be variously modified. For example, the transformation carried out by the frequency analysis means 7 may be any transformation known for use as a method of frequency analysis. Further the filter need not be a one-dimensional filter but may be of any type so long as it satisfies the aforesaid condition.

Further though description has been made on the result of the invention using a simple sine wave signal, all image signals are of a superposition of sine waves and, accordingly, the result of the present invention described above can also be applied to more complicated image signals.

What is claimed is:

1. A digital image recording apparatus comprising:

means for carrying out image processing on a first digital image signal obtained by sampling at a predetermined density an image signal representing an original image, wherein the image processing increases the amount of information carried by the first digital image signal and reduces frequency components of the first digital image signal which are higher than the Nyquist rate of the first digital image signal, thereby obtaining a second digital image signal; and a high density recorder which reproduces the second digital image signal on a recording medium at a density higher than said predetermined density, thereby forming an image which is higher in resolution than that obtained from the first digital image signal and equal in size to that obtained from the first digital image signal;

wherein the means for carrying out image processing comprises a means for obtaining the second digital image signal by carrying out an interpolation processing on the first digital image signal by use of a filter which satisfies the condition $R(f) \leq 0.2$ in at least 80% of the region where $N/2 < f \leq N$, wherein N/2 represents the Nyquist rate of the first digital image signal, f represents the frequency, and R(f) represents the properties of the filter.

2. A digital image recording method comprising the steps of:

(a) carrying out image processing on a first digital image signal obtained by sampling at a predetermined density an image signal representing an original image, wherein the image processing increases the amount of information carried by the first digital image signal and reduces frequency components of the first digital image signal which are higher than the Nyquist rate of the first digital image signal, thereby obtaining a second digital image signal, and (b) reproducing the second digital image signal on a recording medium at a density higher than said predetermined density, thereby forming an image which is higher in resolution than that obtained from the first digital image signal and equal in size to that obtained from the first digital image signal;

wherein in said step (a), the second digital image signal is obtained by carrying out interpolation processing on the first digital image signal by use of a filter which satisfies the condition $R(f) \leq 0.2$ in at least 80% of the region where $N/2 < f \leq N$, wherein N/2 represents the Nyquist rate of the first digital image signal, f represents the frequency, and R(f) represents the properties of the filter.

3. A digital image recording apparatus comprising:

a filter which receives as an input a first digital image signal obtained by sampling, at a predetermined sampling density, an image signal representing an original image, the filter satisfying the condition $R(f) \leq 0.2$ in at least 80% of the region where $N/2 < f \leq N$, wherein N/2 represents the Nyquist rate of the first digital image signal, f represents the frequency, R(f) represents the properties of the filter, and wherein the filter interpolates the received first digital image signal to obtain a second digital image signal, the second digital image signal having an increased amount of information, with respect to the first digital image signal, and reduced frequency components which are higher than the Nyquist rate of the first digital image signal, with respect to the first digital image signal; and a high density recorder which receives the second digital image signal as an input, and which reproduces the second digital image signal on a recording medium at a density higher than said predetermined density, thereby forming an image which is higher in resolution than that obtained from the first digital image signal and equal in size to that obtained from the first digital image signal.

* * * * *